United States Patent [19]

Hare et al.

[11] 4,142,510

[45] Mar. 6, 1979

[54] SOLAR HEATER

[75] Inventors: John G. Hare, Beckenham; Ronald D. Leaver, Swanley, both of England

[73] Assignee: Fortress Engineering Limited, London, England

[21] Appl. No.: 813,305

[22] Filed: Jul. 6, 1977

[30] Foreign Application Priority Data

Jul. 9, 1976 [GB] United Kingdom ............... 28628/76

[51] Int. Cl.$^2$ .............................................. F24J 3/02
[52] U.S. Cl. .................................................. 126/271
[58] Field of Search ................................. 126/270, 271

[56] References Cited

U.S. PATENT DOCUMENTS

| | | | |
|---|---|---|---|
| 4,002,499 | 1/1977 | Winston | 126/271 |
| 4,011,855 | 3/1977 | Eshelman | 126/270 |
| 4,059,093 | 11/1977 | Knowles et al. | 126/271 |

*Primary Examiner*—Carroll B. Dority, Jr.
*Attorney, Agent, or Firm*—William Anthony Drucker

[57] ABSTRACT

The solar heater comprises an elongate concave reflector having a reflecting surface consisting of two interconnecting portions which are substantially symmetrical about a longitudinal plane of the reflector. Each portion in section is of substantially compound parabolic curvature. A heat absorbing device is disposed within the space defined by the reflector substantially symmetrically about said longitudinal place. The heat absorbing device includes a duct for receiving and conveying a heat transfer medium, said duct having surfaces in the form of plates extending laterally of said plane towards side regions of the two portions. Side plates extend downwardly from the distal edges of the laterally extending plates.

The heat absorbing device is so positioned in relation to said reflecting surface and the curvature of the reflecting surface is so dimensioned that substantially the whole of the energy radiation entering through the spaces between the device and the side regions is reflected onto that part of the surface of the absorbing device not receiving direct energy radiation irrespective of the angle of incidence of the energy radiation on the reflector.

2 Claims, 4 Drawing Figures

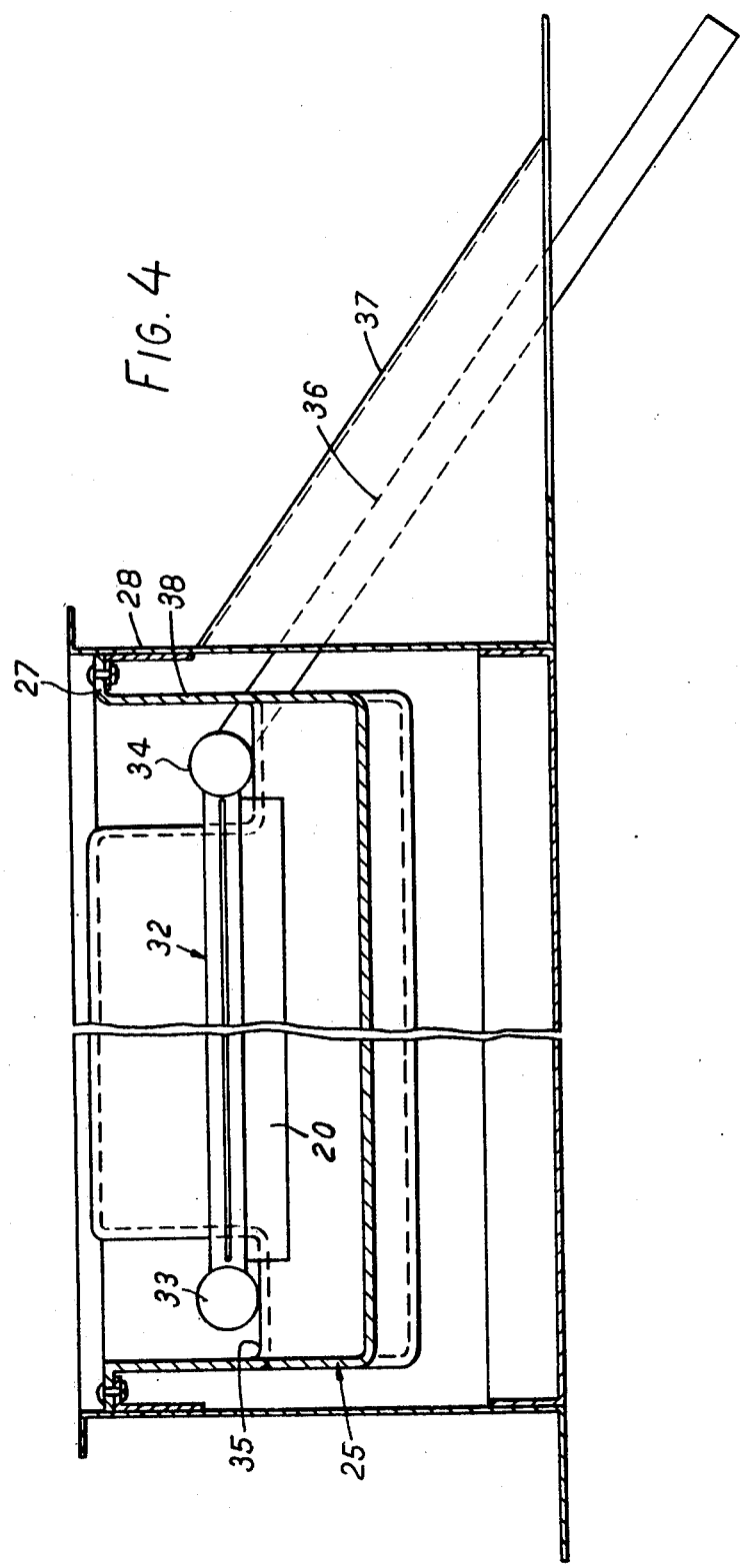

SOLAR HEATER

BACKGROUND TO INVENTION

This invention relates to solar panel having an improved design, whereby a much increased volume of solar radiation can be collected compared with known solar panels.

It is well known that any surface preferably blackened, when exposed to solar radiation, whether direct or diffuse, increases in temperature. If the surface has some means whereby the radiation reaching it can be transferred to some other medium, such as water or air, then the device is acting as a 'solar heater'. Methods of improving the performance of such heaters include (1) the provision of one or more glass or translucent plastic covers on the front side, establishing the well known "Greenhouse Effect", (ii) the addition of appropriate insulation at the back of the collector surface and at the sides, (iii) reducing the emissivity of the surface in the long wave lengths, while keeping its emissivity high for incoming solar radiation, usually by means of a "selective surface". Solar heaters can be classified into two main groups, one being "concentrators", in which the direct sunbeam is focussed to some central point (often a cylindrical pipe is placed in a parabolic trough), the other being "flat plate collectors", and a wide variation of materials have been used.

The conventional flat plate collector is well established for both domestic water heating and for space heating applications. Its use in the United Kingdom has been described for example in a recent report by the United Kingdom section of the International Solar Energy and by the recently published United Kingdom government report. Among its advantages are (a) the ability to raise the water temperature to a level where it can make a significant contribution to the domestic and/or space heating demand (b) the ability to achieve this, during the summer months, at reasonable efficiencies, typically in the order of 50% or more during periods of good radiation and (c) the ability to supply heat without the necessity of any tracking device or mechanism. The major drawback to the use of the simple flat-plate collector in the United Kingdom is the relative weakness of the solar radiation level especially during the winter months. Another feature which tends to act against more widespread use of the simple black flat-plate collector is its appearance. Areas of black surface on a light coloured roof or wall can be considered to be detrimental to the overall visual senerity.

The compound parabolic concentration (CPC) was first described by Winston & Hinterberger in 1966 and serious work on its use as a solar energy concentrating collector began in various centres following a more recent paper by Winston in 1974. The basic compound parabolic collector consists of parabolic reflectors which funnel the radiation from aperture to absorber. The right and left half belong to different, but similar parabolas with the axis of each inclined at the same angle (the collector acceptance half angle) with the collector axis. The focus of the right hand parabola is at the intersection of the left hand parabola with the base line along which the absorber plate is placed. No long wave radiation can leave the collector outside its acceptance angle, so that the overall performance of a conventional collector with a good selective surface is obtained without any costly chemical coating processes.

To achieve even moderate concentration ratios the depth of the collector, H, must be several times greater than the aperture, and this resulted in the development of the truncated CPC. The top section of the reflectors in FIG. 1. do not intercept much radiation and can be omitted without any significant loss in concentration. Nevertheless, even a truncated CPC would be over 300mm deep for 3:1 concentration ratio.

Another type of concentrating collector is based on the use of a logarithmic spiral, rather than a parabola, and collectors based on this principle are available in the United States. A U.K. design was awarded a prize in the 1975, Copper Development Association competition. The direct beam radiation entering the collector is reflected to the absorber, which normally consists of a bled pipe. Both the compound parabolic collector and the spiral collector have a very limited potential in the U.K. because of their relatively large depth compared with conventional flat-plate collectors and the fact that they cannot make effective use of diffuse radiation.

An object of the present invention is to provide a solar heater which substantially overcomes the drawbacks of these known collectors, and is relatively simple in construction leading to considerable economies in mass production.

SUMMARY OF INVENTION

According to the invention we provide a solar heater comprising a concave reflector having a reflecting surface consisting of two interconnecting portions, each portion in section being of a compound curvature having a parabolic region merging with a logarithmic spiral disposed within the space defined by the reflector, a duct for receiving and conveying a heat transfer medium, first pair of radiation absorbing plates attached to said duct by which the absorbed radiation is conducted to said duct and extending laterally one on each side of the central axis of the reflection and symmetrically therewith, and second pair of radiation absorbing plates attached respectively to the distal edges of said lateral plates, wherein said reflector and said first and second plates are so dimensioned that the area of the aperture of the reflector to the surface area of the first and second plates for exposure to direct radiation is in the ratio of between 2:1 and 1:1.

The invention combines the heat received direct from the sum and that entering through the spaces between the duct and the side regions of the reflector reflected to the plate from the reflecting surface.

BRIEF DESCRIPTION OF THE DRAWINGS

An embodiment of the invention will now be described by way of example with reference to the accompanying drawing, in which:

FIG. 4 is a sectional view of the heater shown in FIG. 3 taken along the line IV—IV with the side wall of the casing omitted, and FIG. 5 is a plan view of the heater on a smaller scale with the absorbers and headers omitted.

DESCRIPTION OF PREFERRED EMBODIMENTS

Figure 1:
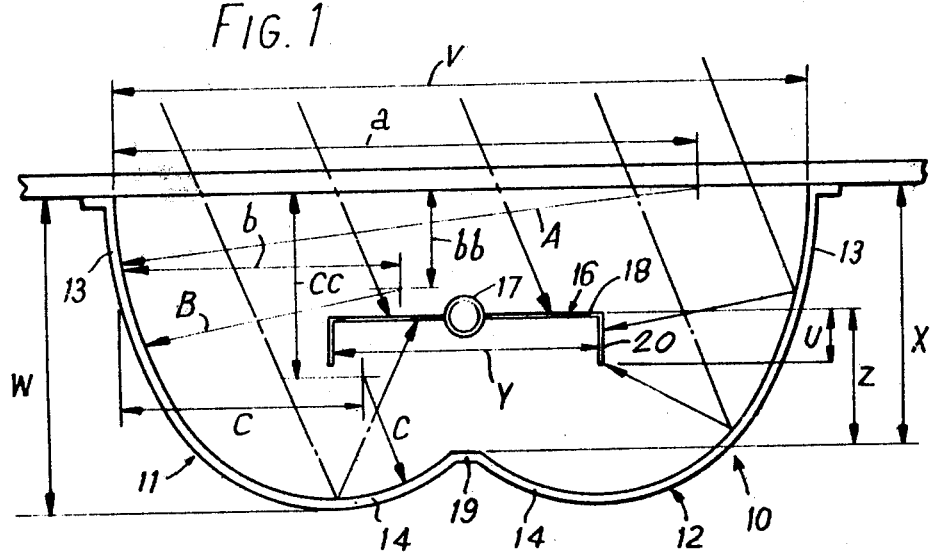
FIG. 1 is a section taken through the solar heater shown schematically.

The solar heater, shown in FIG. 1, comprises a reflector 10 having two portions 11,12 symmetrial about a longitudinal plane of the reflector. Each portion 11,12 in section is of substantially compound parabolic curvature. By "compound parabolic" we mean that the side regions 13 of the reflector are curved in accordance with a parabola and the inner regions 14 of the collector are logarithmic spirals.

A heat absorbing element 16 is disposed within the space defined by the reflector symmetrically about the longitudinal plane. A central tube 17 has heat absorbing surfaces extending laterally of said plane towards the side regions 13 formed by horizontal plates, 18 contiguous with downwardly extending plates 20 at the distal edges of the horizontal plates 18. The two portions of the reflector are joined together by a horizontal strip 19 which is preferably formed integrally with said portions.

The reflector may be formed by moulded fibre glass or plastic material with silver plating or white paint thereon. The plates 18 and 20 may be made of aluminium and may be attached by a resin/aluminium based adhesive to the central tube 17 made of copper. The horizontal and vertical plates may be formed from sheet copper which have oxidised surfaces to produce an efficient absorbing surface known as a "selective surface". The surfaces of the horizontal plates, the tube and vertical plate are preferably blackened (matt black paint) to assist in heat absorption. The reflector 10 is enclosed by a glass cover plate 21.

In a specific construction of the reflector the logarithmic spiral and parabola were closely approximated by selecting the following dimensions as referenced on FIG. 1.

| Radius | Horizontal dimension relative to left hand edge | Vertical dimension relative to upper edge of reflector |
|---|---|---|
| A = 184 | a = 184 | — |
| B = 91.5 | b = 93.5 | bb = 19.5 |
| C = 56 | c = 69.5 | cc = 46 |

Other dimensions shown on FIG. 1.
V = 230 mm
W = 102 mm
X = 85 mm
Y = 100 mm
Z = 50 mm
U = 25 mm The dimensions may be scaled up or down by any desired factor according to the size of the solar heater required.

In this example the reflector aperture has an area 230 × 840 mm = 193200 mm², the upper surface of the horizontal plates 18 of the absorber an area of 100 × 770 mm = 77000 mm² (including the projected area of the tube) and the outer surfaces of the vertical plates 20 an area of 770 × 25 × 2 = 38500 mm². The total outer area of the absorber is therefore 77000 + 38500 = 115500 mm². The ratio of the aperture area to total outer absorber area is 1:0.598 (or 1.67:1). This ratio is preferably in the range of 1:0.5 (2:1) to 1.1.

All known focusing collectors have an unavoidable high aperture ratio, the ratio of the flat area of the reflector to the flat area of absorber usually 8:1 or thereabouts.

In the arrangement of the present invention the absorber surface is increased both laterally and totally to reduce this ratio and provide high performance under both diffuse and direct radiation conditions.

From the figures given above, it can be seen that the ratio of aperture area to total absorber area is approaching 1:1, which is the ultimate desired value which the present invention seeks to achieve in order to ensure that the collector behaves as well as a flat-plate collector under diffuse radiation conditions and considerably better than a flat-plate collector under direct radiation conditions. The arrangement provides for a reduction in re-radiated or emitted radiation from the collector plate by virtue of the selected ratio of the absorber surface receiving energy direct to the total aperture area.

Although ideally the aperture reflector area ratio of 1:1 is desirable ratios between 1:0.5 and 1:1 achieve the desired improvement in the heater efficiency.

Figure 2:
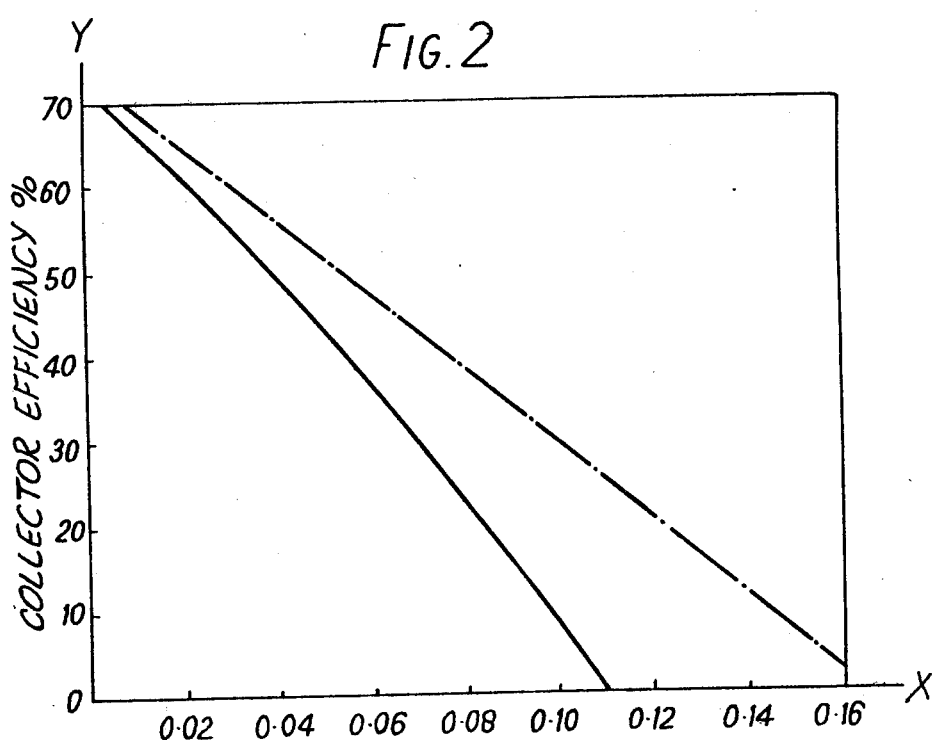
FIG. 2 shows efficiency characteristics for a known single glazed solar heater and a solar heater in accordance with the present invention.

In the FIG. 2 there are shown efficiency curves for a single glazed flat plate collector and for the solar heater of the present invention represented respectively by a full line and a chain line. The Y axis represents percentage collector efficiency and the X axis represents power in watts per square meter per °C. $(T_C-T_A)/I$ where $T_C$ = mean collector temperature, $T_A$ = ambient air temperature and I = intensity of incident radiation.

The efficiency of collection falls as the difference between the average plate temperature and the ambient air temperature rises. In the efficiency curve shown in FIG. 2 collection efficiency is also a function of the incident radiation. Because of the decline in collector efficiency with increasing plate temperature, a normal domestic hot water temperature of 55° C. can be achieved in the U.K. only on a few days in any year with a single glazed flat plate solar collector. The double acting improved focussing and absorber solar collector is, about four times greater than the single glazed flat plate solar collector under high temperature conditions, typically indicated at 0.10m²° $CW^{-1}$ on FIG. 2.

Figure 3:
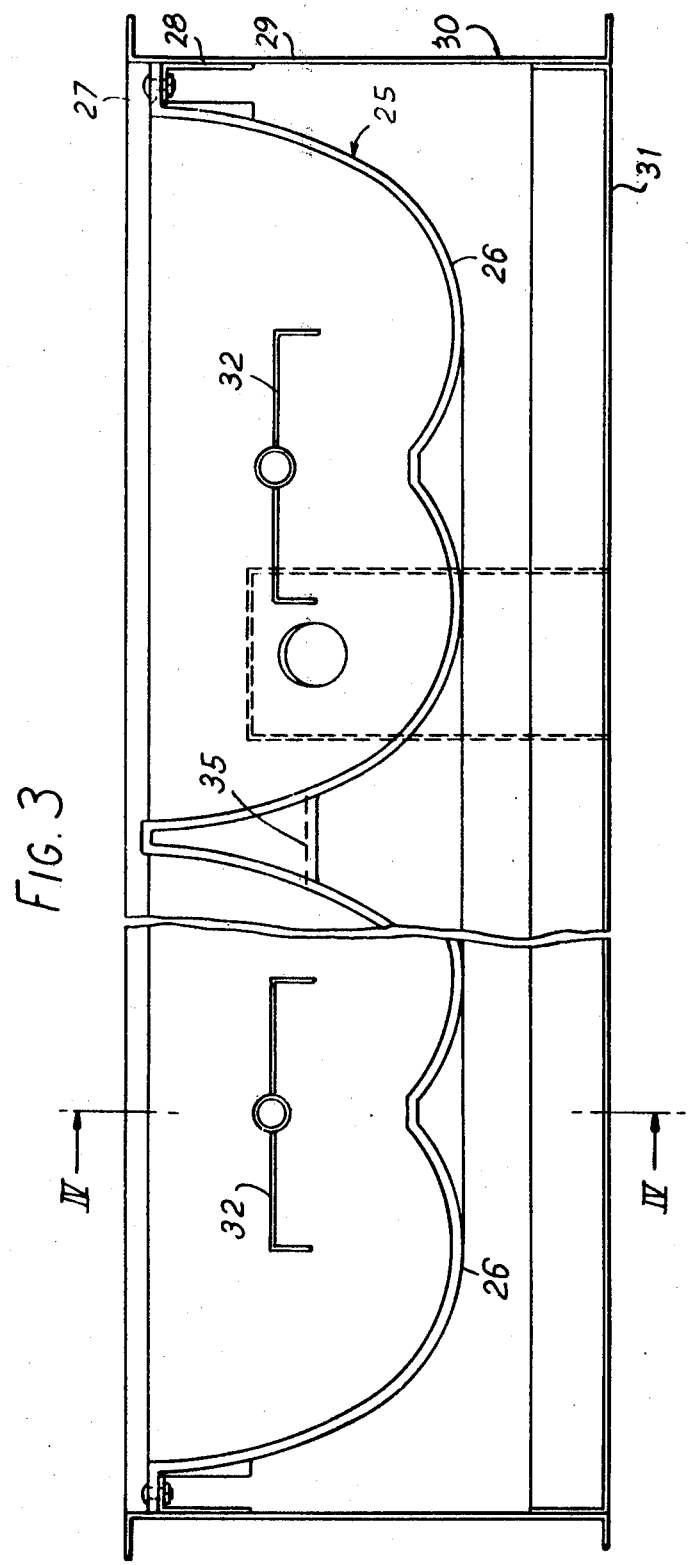
FIG. 3 is an end elevation of a constructional form of a solar heater employing a multiple collector with the end wall of the casing omitted, the absorber comprising a pipe with horizontal plates extending therefrom and a central vertical plate.

The heater shown in FIG. 1 is shown with more constructional detail in FIGS. 3 to 5. In this example a one piece moulded collector/reflector unit 25 is formed with a number of parallel disposed reflectors 26 each shaped as described above. The unit 25 is formed at each side with flanges 27 which rest on brackets 28 attached to the side walls 29 of a casing 30 closed at its lower end by a base 31.

Within the reflectors 26 are disposed absorbers 32 connected at their ends to headers 33, 34 to form a pipe matrix. The headers rest on horizontal supports 35 formed in the moulding of the unit 25 at the juncture of adjacent reflectors. Inlet and outlet pipes 36 (only one shown) are connected to the headers and pass through the end wall 38 of the unit into an extension 37 of the casing.

one important feature of the pipe matrix is that the distance between adjacent pipes is much greater than in a conventional flat-plate and only about one third of the overall surface is metallic - thus a considerable saving in copper pipe and fin material (aluminium or copper) is possible.

To reduce the escape of reflected radiation because of the omission of the support plate substantially to zero the dimensions of the absorber as so selected and the absorber so positioned in relation to the reflector that the distance from any point on the reflector to the nearest point on the vertical plate 51 is equal to or less than the distance between the distal edge of the horizontal plate 52 and the intersection of of the plane of the horizontal plate with the reflecting surface.

The logarithmic spiral used in the example ensures that no direct beam radiation can be reflected out of the collector and is trapped by the surfaces of the absorber not receiving direct energy radiation.

The solar heater is preferably of elongate form having the section shown in FIG. 4 but may be circular.

The reflector of the above example may be made of a suitable polymer which can be treated by metal spraying to give a reflecting surface. The reflector may be constructed by using a sheet aluminium mould into which polyurethane foam is poured, the surface of the latter being treated after removal of the aluminium sheet for example by anodising.

Results from tests carried out to date indicate that the heater of the present invention has a superior performance over any conventional single-glazed flat-plate collector. One very significant feature is the very rapid response to intermittent sunshine conditions, which makes it superior to other types of collector in typical spring or autumn conditions in the U.K. This is due to the focussing effect. Smaller collector area/ storage volume ratios are achieved with the present invention than with conventional flat-plate systems.

Since the internal sides of the reflector are shaped to substantially parabolic and logarithmic spiralling curves all the entering direct beam radiation not falling on the upper surface of the absorber will be reflected onto the under surfaces of the plates or sides of the vertical plate and the heat transferred by conduction to the heat transfer medium contained in the central tube.

We claim:
1. A solar heater comprising:
   (a) a concave reflector having a reflecting surface consisting of two interconnecting portions, each portion in section being of a compound curvature having a parabolic region merging with a logarithimic spiral, disposed within the space defined by the reflector,
   (b) a duct for receiving and conveying a heat transfer medium,
   (c) first pair of radiation absorbing plates attached to said duct by which the absorbed radiation is conducted to said duct and extending laterally one on each side of the central axis of the reflector and symmetrically therewith, and
   (d) second pair of radiation absorbing plates attached substantially perpendicularly respectively to the distal edges of said lateral plates and extending toward acid reflector, wherein said reflector and said first and second plates are so dimensioned that the area of the aperture of the reflector to the surface area of the first and second plates for exposure to direct radiation is in the ratio of between 2:1 and 1:1.
2. A solar heater according to claim 1, wherein the first and second plates are disposed in parallel planes.

* * * * *